(12) United States Patent
Sakurai et al.

(10) Patent No.: US 9,065,281 B2
(45) Date of Patent: *Jun. 23, 2015

(54) CHARGE/DISCHARGE CONTROL CIRCUIT AND BATTERY DEVICE

(75) Inventors: Atsushi Sakurai, Chiba (JP); Toshiyuki Koike, Chiba (JP); Kazuaki Sano, Chiba (JP); Fumihiko Maetani, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 147 days.

This patent is subject to a terminal disclaimer.

(21) Appl. No.: 13/208,753

(22) Filed: Aug. 12, 2011

(65) Prior Publication Data

US 2012/0056592 A1    Mar. 8, 2012

(30) Foreign Application Priority Data

Sep. 8, 2010  (JP) .................................. 2010-201124

(51) Int. Cl.
*H02J 7/00*          (2006.01)

(52) U.S. Cl.
CPC .................................... *H02J 7/0034* (2013.01)

(58) Field of Classification Search
CPC ............................... H02J 7/0031; Y02E 60/12
USPC .................................................. 320/134, 136
See application file for complete search history.

(56) References Cited

U.S. PATENT DOCUMENTS

| 7,154,291 B2 * | 12/2006 | Turner ..................... | 324/762.09 |
| 7,319,347 B2 * | 1/2008 | Cho et al. ..................... | 327/111 |
| 7,710,076 B2 * | 5/2010 | Goto ............................. | 320/134 |
| 2003/0122525 A1 * | 7/2003 | Stellberger ..................... | 320/134 |
| 2005/0156573 A1 * | 7/2005 | Lin ................................ | 320/134 |
| 2006/0076931 A1 * | 4/2006 | Mandai ......................... | 320/134 |
| 2009/0121683 A1 * | 5/2009 | Goto .............................. | 320/134 |
| 2009/0212741 A1 * | 8/2009 | Ferguson ....................... | 320/134 |
| 2010/0141215 A1 * | 6/2010 | Takeda .......................... | 320/136 |
| 2011/0068735 A1 * | 3/2011 | Nicholson et al. ............ | 320/107 |
| 2011/0074356 A1 * | 3/2011 | Yamazaki et al. ............ | 320/134 |

FOREIGN PATENT DOCUMENTS

| JP | 2000-102182 A |   | 4/2000 |
| JP | 2000102182 A | * | 4/2000 |

* cited by examiner

*Primary Examiner* — Richard Isla Rodas
*Assistant Examiner* — Michael Dibendetto
(74) *Attorney, Agent, or Firm* — Brink Gilson & Lione

(57) ABSTRACT

Provided is a battery device for controlling charge/discharge of a secondary battery by a single bidirectionally conductive field effect transistor, a charge/discharge control circuit with which a leakage current of the bidirectionally conductive field effect transistor is reduced to perform stable operation. The charge/discharge control circuit includes: a switch circuit for controlling a gate of the bidirectionally conductive field effect transistor based on an output of a control circuit for controlling the charge/discharge of the secondary battery; and two MOS transistors for preventing back-flow of a charge current and a discharge current. The first MOS transistor has a drain and a back gate which are connected to each other, and a source connected to a drain of the bidirectionally conductive field effect transistor. The second MOS transistor has a drain and a back gate which are connected to each other, and a source connected to a source of the bidirectionally conductive field effect transistor.

9 Claims, 4 Drawing Sheets

US 9,065,281 B2

CHARGE/DISCHARGE CONTROL CIRCUIT AND BATTERY DEVICE

RELATED APPLICATIONS

This application claims priority under 35 U.S.C. §119 to Japanese Patent Application No. 2010-201124 filed on Sep. 8, 2010, the entire content of which is hereby incorporated by reference.

BACKGROUND OF THE INVENTION

1. Field of the Invention

The present invention relates to a charge/discharge control circuit for detecting a voltage and an abnormality of a secondary battery and to a battery device including the charge/discharge control circuit, and more particularly, to a charge/discharge control circuit capable of control by a single charge/discharge control MOSFET and to a battery device including the charge/discharge control circuit.

2. Description of the Related Art

FIG. 5 illustrates a circuit diagram of a battery device including a conventional charge/discharge control circuit. In the battery device including the conventional charge/discharge control circuit, an enhancement mode N-channel MOSFET 306 capable of bidirectional energization/interruption is connected in series to a negative terminal of a secondary battery 101. A charge circuit or a load is connected to terminals 120 and 121, and a charge/discharge current is supplied or discharged to or from the secondary battery 101 via the terminals 120 and 121. A control circuit 102 detects a voltage of the secondary battery 101 and a voltage of the enhancement mode N-channel MOSFET 306, and controls ON/OFF of switches 301, 304, and 305 based on the detected values. When a potential of a gate terminal of the enhancement mode N-channel MOSFET 306 is equal to or higher than a positive threshold voltage, the enhancement mode N-channel MOSFET 306 provides bidirectional energization between the drain terminal and the source terminal thereof. When the potential of the gate terminal is lower than the threshold voltage, the enhancement mode N-channel MOSFET 306 enters the OFF state between the drain terminal and the source terminal.

A charge-inhibited state is described. When a charger is connected between the terminals 120 and 121, a voltage Vds between the drain terminal and the source terminal of the enhancement mode N-channel MOSFET 306 has a positive value. The control circuit 102 detects that the voltage Vds is positive, and turns ON the switch 301 and OFF the switches 305 and 304. Accordingly, the gate terminal of the enhancement mode N-channel MOSFET 306 has a voltage higher than that of the source terminal thereof by the voltage of the secondary battery 101, with the result that the enhancement mode N-channel MOSFET 306 enters the energized state.

When the secondary battery 101 is charged and the battery voltage reaches a set upper limit value, the control circuit 102 turns OFF the switch 301 and ON the switches 305 and 304. Then, the gate terminal of the enhancement mode N-channel MOSFET 306 has the same potential as that of the source terminal thereof, with the result that the enhancement mode N-channel MOSFET 306 enters the OFF state. As a result, the charge current is interrupted to prevent overcharge of the secondary battery 101. Further, at this time, a diode 302 is reverse-biased to prevent the current from flowing through the switch 304 and the switch 305.

When the charge current is interrupted, no voltage drop by internal resistance occurs and the voltage of the secondary battery 101 reduces. In order to prevent the re-start of charge in response to the voltage reduction, after the charge is inhibited, the charge-inhibited state is maintained until the secondary battery 101 is discharged to some extent to have a voltage that is equal to or lower than a set value. Under the charge-inhibited state, if a load is connected between the terminals 120 and 121, the voltage Vds is switched from positive to negative. The control circuit 102 is thus configured to control the switches 301, 304, and 305 so that the secondary battery 101 may be discharged when the voltage Vds is negative and that the charge current may be interrupted when the voltage Vds is positive.

In the above description, the switches 304 and 305 are both turned ON at the time of the stop of charge. However, the charge can be stopped similarly even if the switch 304 is turned OFF. The first reason is that the switch 305 is ON regardless of ON/OFF of the switch 304, and hence the gate terminal of the enhancement mode N-channel MOSFET 306 has the same potential as that of the source terminal thereof and the enhancement mode N-channel MOSFET 306 thus enters the OFF state. The second reason is that the diode 302 also interrupts the current flowing through the switches 304 and 305.

Note that, the switches 304 and 305 are both OFF at the time of the charge described above and at the time of the discharge to be described later. Accordingly, if the switches 304 and 305 are both turned ON at the time of the stop of charge and the switches 304 and 305 are both turned ON also at the time of the stop of discharge as described later, the two switches are turned ON or OFF simultaneously all the time. It is therefore not necessary to control the switches 304 and 305 independently, which can simplify the configuration of the control circuit 102.

Next, a discharge-inhibited state is described. When a load is connected between the terminals 120 and 121, the voltage Vds between the drain terminal and the source terminal of the enhancement mode N-channel MOSFET 306 has a negative value. The control circuit 102 detects that the voltage Vds is negative, and turns ON the switch 301 and OFF the switches 304 and 305. Accordingly, the gate terminal of the enhancement mode N-channel MOSFET 306 has a voltage higher than that of the drain terminal thereof by the voltage of the secondary battery 101, with the result that the enhancement mode N-channel MOSFET 306 enters the energized state.

When the discharge of the secondary battery 101 progresses and the battery voltage reaches a set lower limit value, the control circuit 102 turns OFF the switch 301 and ON the switches 304 and 305. Then, the gate terminal of the enhancement mode N-channel MOSFET 306 has the same potential as that of the drain terminal thereof, with the result that the enhancement mode N-channel MOSFET 306 enters the OFF state. As a result, the discharge current is interrupted to prevent overdischarge of the secondary battery 101. Further, at this time, a diode 303 is reverse-biased to prevent the current from flowing through the switch 304 and the switch 305.

When the discharge current is interrupted, no voltage drop by internal resistance occurs and the voltage of the secondary battery 101 increases. In order to prevent the re-start of discharge in response to the voltage increase, after the discharge is inhibited, the discharge-inhibited state is maintained until the secondary battery 101 is charged to some extent to have a voltage that is equal to or higher than a set value. Under the discharge-inhibited state, if the charge circuit is connected between the terminals 120 and 121, the voltage Vds is switched from negative to positive. The control circuit 102 is thus configured to control the switches 301, 304, and 305 so that the secondary battery 101 may be charged when the voltage Vds is positive and that the discharge current may be interrupted when the voltage Vds is negative.

In the above description, the switches 304 and 305 are both turned ON at the time of the stop of discharge. However, the discharge can be stopped similarly even if the switch 305 is turned OFF. The first reason is that the switch 304 is ON regardless of ON/OFF of the switch 305, and hence the gate terminal of the enhancement mode N-channel MOSFET 306 has the same potential as that of the drain terminal thereof and the enhancement mode N-channel MOSFET 306 thus enters the OFF state. The second reason is that the diode 303 also interrupts the current flowing through the switches 305 and 304.

Note that, if the switches 304 and 305 are both turned ON at the time of the stop of discharge, as described above, the two switches are turned ON or OFF simultaneously all the time. It is therefore not necessary to control the switches 304 and 305 independently, which can simplify the configuration of the control circuit 102.

The enhancement mode N-channel MOSFET 306 has built-in diodes 321 and 322 formed therein. However, the diodes 321 and 322 are connected in series in opposite directions and hence are not electrically connected to each other, which has no influence on the protection operation described above.

The enhancement mode N-channel MOSFET 306 may be of either a lateral structure or a vertical structure. In the case of the lateral structure, it is easy to form the enhancement mode N-channel MOSFET 306 and the control circuit 102 as a single IC. Therefore, the reduction in size and cost can be achieved because the overcharge/overdischarge protection circuit, which has heretofore been formed by a single IC and two switches, can be formed by a single IC. On the other hand, in the case of the vertical structure, the reduction in loss can be achieved as compared to the lateral structure (see, for example, Japanese Patent Application Laid-open No. 2000-102182 (FIG. 9)).

The conventional technology, however, has a problem that the gate voltage of the enhancement mode N-channel MOSFET 306 can be reduced to no more than the source or drain voltage plus VF (about 0.6 V), and hence a leakage current is large when the enhancement mode N-channel MOSFET 306 is OFF. Further, the back gate of the enhancement mode N-channel MOSFET 306 becomes a floating state, leading to another problem of unstable operation of the battery device including the charge/discharge control circuit.

SUMMARY OF THE INVENTION

The present invention has been made in order to solve the above-mentioned problems, and provides a charge/discharge control circuit capable of stable operation by reducing a leakage current flowing when the charge/discharge control circuit is OFF, and also provides a battery device including the charge/discharge control circuit.

In order to solve the conventional problems, a battery device including a charge/discharge control circuit according to the present invention has the following configuration.

The present invention provides a charge/discharge control circuit for controlling charge/discharge of a secondary battery by a single bidirectionally conductive field effect transistor, the charge/discharge control circuit including: a control circuit connected to both ends of the secondary battery, for monitoring a voltage of the secondary battery; a switch circuit including a first terminal and a second terminal, for controlling a gate of the bidirectionally conductive field effect transistor based on an output of the control circuit; a first transistor including a drain connected to a drain of the bidirectionally conductive field effect transistor, and a source and a back gate which are connected to the first terminal of the switch circuit; and a second transistor including a drain connected to a source of the bidirectionally conductive field effect transistor, and a source and a back gate which are connected to the first terminal of the switch circuit.

According to the battery device including the charge/discharge control circuit of the present invention, the leakage current can be reduced by controlling the gate of the bidirectionally conductive field effect transistor to a source voltage or a drain voltage thereof. Besides, the present invention provides the effect that the bidirectionally conductive field effect transistor can be operated stably by controlling the back gate of the bidirectionally conductive field effect transistor.

DETAILED DESCRIPTION OF THE PREFERRED EMBODIMENTS

Referring to the accompanying drawings, embodiments of the present invention are described below.

[First Embodiment]

Figure 1:
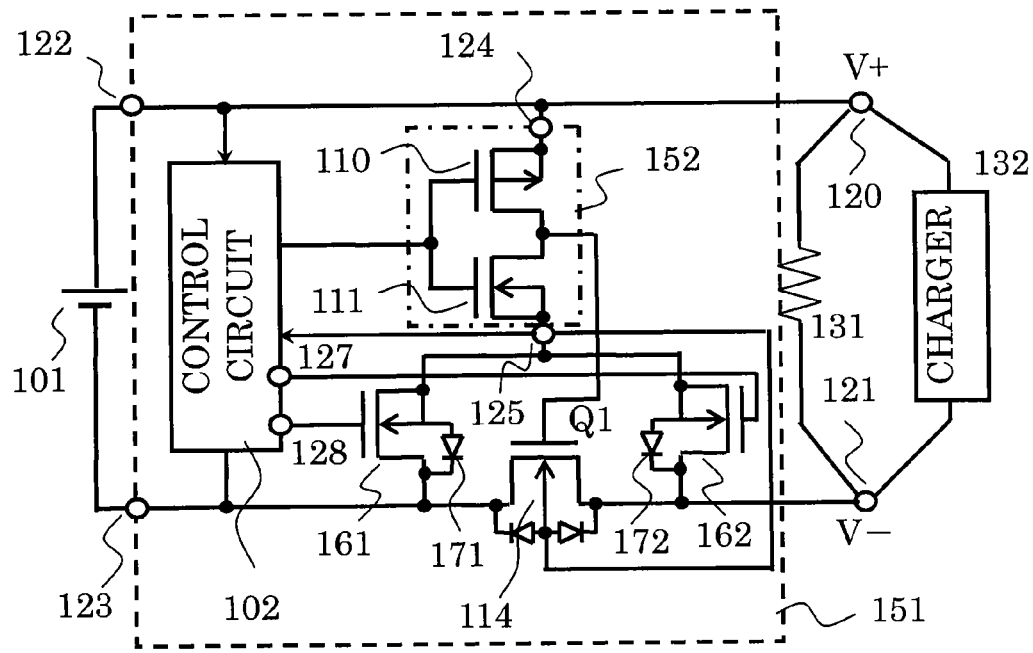
FIG. 1 is a circuit diagram of a battery device including a charge/discharge control circuit according to a first embodiment of the present invention.

FIG. 1 is a circuit diagram of a battery device including a charge/discharge control circuit 151 according to a first embodiment of the present invention.

The battery device including the charge/discharge control circuit 151 of this embodiment includes a secondary battery 101, a control circuit 102, an N-channel bidirectionally conductive field effect transistor 114, external terminals 120 and 121 between which a charger 132 or a load 131 is to be connected, a PMOS transistor 110, and NMOS transistors 111, 161, and 162. The PMOS transistor 110, the NMOS transistor 111, a terminal 124 (second terminal), and a terminal 125 (first terminal) together form a switch circuit 152.

The secondary battery 101 has both ends connected to a positive power supply terminal 122 and a negative power supply terminal 123, respectively. The control circuit 102 is connected to the positive power supply terminal 122 as positive power supply and to the terminal 125 as negative power supply. The control circuit 102 has an output terminal 126 connected to a gate of the PMOS transistor 110 and a gate of the NMOS transistor 111, an output terminal 127 connected to a gate of the NMOS transistor 162, and an output terminal 128 connected to a gate of the NMOS transistor 161. The PMOS transistor 110 has a source connected to the positive power supply terminal 122 and the external terminal 120 via the terminal 124, and a drain connected to a drain of the NMOS transistor 111. The NMOS transistor 111 has a source and a back gate which are connected to a source and a back gate of the NMOS transistor 161 and a source and a back gate of the NMOS transistor 162 via the terminal 125. The NMOS transistor 111 has the drain also connected to a gate of the N-channel bidirectionally conductive field effect transistor 114. The NMOS transistor 161 has a drain connected to the negative power supply terminal 123. The NMOS transistor 162 has a drain connected to the external terminal 121. The N-channel bidirectionally conductive field effect transistor 114 has a drain connected to the negative power supply terminal 123, a source connected to the external terminal 121, and a back gate connected to the terminal 125.

Next, an operation of the battery device including the charge/discharge control circuit 151 according to this embodiment is described.

When the charger 132 is connected between the external terminals 120 and 121 and the control circuit 102 detects that the secondary battery 101 is in a chargeable/dischargeable state, the output terminal 126 of the control circuit 102 outputs Low and the output terminals 127 and 128 thereof output High. Then, the PMOS transistor 110 is turned ON, the NMOS transistor 111 is turned OFF, the NMOS transistor 161 is turned ON, and the NMOS transistor 162 is turned ON. Then, the gate electrode of the N-channel bidirectionally conductive field effect transistor 114 is connected to the positive power supply terminal 122, and the N-channel bidirectionally conductive field effect transistor 114 enters an ON state. This way, charge/discharge is performed. Here, the respective outputs of the control circuit 102 may be such that: the output terminals 126 and 128 output Low while the output terminal 127 outputs High; the output terminals 126 and 127 output Low while the output terminal 128 outputs High; or the output terminals 126, 127, and 128 output Low. The negative power supply of the control circuit 102 is connected to the terminal 125, and hence a lower one of the voltage at the negative power supply terminal 123 and the voltage at the external terminal 121 can be output as Low.

When the charger 132 is connected between the external terminals 120 and 121 and the control circuit 102 detects that the secondary battery 101 has entered a charge-inhibited state, the output terminals 126 and 127 of the control circuit 102 output High and the output terminal 128 thereof outputs Low. Then, the PMOS transistor 110 is turned OFF, the NMOS transistor 111 is turned ON, the NMOS transistor 161 is turned OFF, and the NMOS transistor 162 is turned ON. Then, the gate of the N-channel bidirectionally conductive field effect transistor 114 is connected to the external terminal 121 via the NMOS transistor 162, the terminal 125, and the NMOS transistor 111. The N-channel bidirectionally conductive field effect transistor 114 then enters the OFF state. This way, a charge current is interrupted to prevent overcharge of the secondary battery 101. Here, a parasitic diode 171 is reverse-biased to prevent the current from flowing from the negative power supply terminal 123 to the external terminal 121. The gate voltage of the N-channel bidirectionally conductive field effect transistor 114 is connected to the external terminal 121 to be reduced to the source voltage of the N-channel bidirectionally conductive field effect transistor 114, to thereby reduce a leakage current. The back gate terminal of the N-channel bidirectionally conductive field effect transistor 114 is connected to the external terminal 121 via the terminal 125 and the NMOS transistor 162 and hence does not become a floating state, which enables more stable operation of the charge/discharge control circuit 151. The negative power supply of the control circuit 102 is connected to the terminal 125, and hence the voltage at the external terminal 121 can be output as Low.

When the load 131 is connected between the external terminals 120 and 121 and the control circuit 102 detects that the secondary battery 101 has entered a discharge-inhibited state, the output terminals 126 and 128 of the control circuit 102 output High and the output terminal 127 thereof outputs Low. Then, the PMOS transistor 110 is turned OFF, the NMOS transistor 111 is turned ON, the NMOS transistor 161 is turned ON, and the NMOS transistor 162 is turned OFF. Then, the gate of the N-channel bidirectionally conductive field effect transistor 114 is connected to the negative power supply terminal 123 via the NMOS transistor 161, the terminal 125, and the NMOS transistor 111. The N-channel bidirectionally conductive field effect transistor 114 then enters the OFF state. This way, a discharge current is interrupted to prevent overdischarge of the secondary battery 101. Here, a parasitic diode 172 is reverse-biased to prevent the current from flowing from the external terminal 121 to the negative power supply terminal 123. The gate voltage of the N-channel bidirectionally conductive field effect transistor 114 is connected to the negative power supply terminal 123 to be reduced to the drain voltage of the N-channel bidirectionally conductive field effect transistor 114, to thereby reduce the leakage current. The back gate terminal of the N-channel bidirectionally conductive field effect transistor 114 is connected to the negative power supply terminal 123 via the terminal 125 and the NMOS transistor 161 and hence does not become a floating state, which enables more stable operation of the charge/discharge control circuit 151. The negative power supply of the control circuit 102 is connected to the terminal 125, and hence the voltage at the negative power supply terminal 123 can be output as Low.

Note that, the N-channel bidirectionally conductive field effect transistor 114 may be externally connected to the charge/discharge control circuit 151.

As described above, according to the battery device including the charge/discharge control circuit 151 of this embodiment, the leakage current flowing through the N-channel bidirectionally conductive field effect transistor 114 can be reduced in either case where the secondary battery 101 has entered the charge-inhibited state or the discharge-inhibited state. In addition, by connecting the back gate of the N-channel bidirectionally conductive field effect transistor 114 to the external terminal 121 or the negative power supply terminal 123, the charge/discharge control circuit 151 can be operated stably.

[Second Embodiment]

Figure 2:
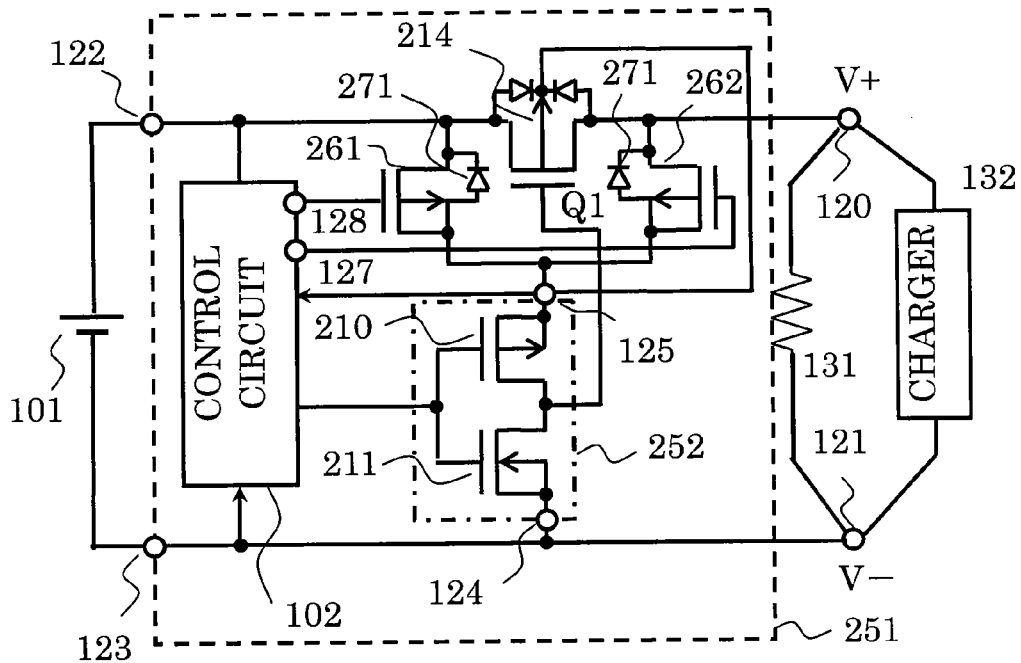
FIG. 2 is a circuit diagram of a battery device including a charge/discharge control circuit according to a second embodiment of the present invention.

FIG. 2 is a circuit diagram of a battery device including a charge/discharge control circuit 251 according to a second embodiment of the present invention.

The battery device including the charge/discharge control circuit 251 of the second embodiment includes a secondary battery 101, a control circuit 102, a P-channel bidirectionally conductive field effect transistor 214, external terminals 120 and 121 between which a charger 132 or a load 131 is to be connected, PMOS transistors 210, 261, and 262, and an NMOS transistor 211. The PMOS transistor 210, the NMOS transistor 211, a terminal 124 (second terminal), and a terminal 125 (first terminal) together form a switch circuit 252.

The secondary battery 101 has both ends connected to a positive power supply terminal 122 and a negative power supply terminal 123, respectively. The control circuit 102 is connected to the terminal 125 as positive power supply and to the negative power supply terminal 123 as negative power supply. The control circuit 102 has an output terminal 126 connected to a gate of the PMOS transistor 210 and a gate of the NMOS transistor 211, an output terminal 127 connected to a gate of the PMOS transistor 262, and an output terminal 128 connected to a gate of the PMOS transistor 261. The PMOS transistor 210 has a source and a back gate which are connected to a source and a back gate of the PMOS transistor 261 and a source and a back gate of the PMOS transistor 262 via the terminal 125. The PMOS transistor 210 has a drain connected to a drain of the NMOS transistor 211. The NMOS transistor 211 has a source connected to the negative power supply terminal 123 and the external terminal 121 via the terminal 124. The NMOS transistor 211 has the drain also connected to a gate of the P-channel bidirectionally conductive field effect transistor 214. The PMOS transistor 261 has a drain connected to the positive power supply terminal 122. The PMOS transistor 262 has a drain connected to the external terminal 120. The P-channel bidirectionally conductive field effect transistor 214 has a drain connected to the positive power supply terminal 122, a source connected to the external terminal 120, and a back gate connected to the terminal 125.

Next, an operation of the battery device including the charge/discharge control circuit 251 according to the second embodiment is described.

When the charger 132 is connected between the external terminals 120 and 121 and the control circuit 102 detects that the secondary battery 101 is in a chargeable/dischargeable state, the output terminal 126 of the control circuit 102 outputs High and the output terminals 127 and 128 thereof output Low. Then, the PMOS transistor 210 is turned OFF, the NMOS transistor 211 is turned ON, the PMOS transistor 261 is turned ON, and the PMOS transistor 262 is turned ON. Then, the gate electrode of the P-channel bidirectionally conductive field effect transistor 214 is connected to the negative power supply terminal 123, and the P-channel bidirectionally conductive field effect transistor 214 enters an ON state. This way, charge/discharge is performed. Here, the respective outputs of the control circuit 102 may be such that: the output terminals 126 and 128 output High while the output terminal 127 outputs Low; the output terminals 126 and 127 output High while the output terminal 128 outputs Low; or the output terminals 126, 127, and 128 output High. The positive power supply of the control circuit 102 is connected to the terminal 125, and hence a higher one of the voltage at the positive power supply terminal 122 and the voltage at the external terminal 120 can be output as High.

When the charger 132 is connected between the external terminals 120 and 121 and the control circuit 102 detects that the secondary battery 101 has entered a charge-inhibited state, the output terminals 126 and 127 of the control circuit 102 output Low and the output terminal 128 thereof outputs High. Then, the PMOS transistor 210 is turned ON, the NMOS transistor 211 is turned OFF, the PMOS transistor 261 is turned OFF, and the PMOS transistor 262 is turned ON. Then, the gate electrode of the P-channel bidirectionally conductive field effect transistor 214 is connected to the external terminal 120 via the PMOS transistor 262, the terminal 125, and the PMOS transistor 210. The P-channel bidirectionally conductive field effect transistor 214 then enters the OFF state. This way, a charge current is interrupted to prevent overcharge of the secondary battery 101. Here, a parasitic diode 271 is reverse-biased to prevent the current from flowing from the external terminal 120 to the positive power supply terminal 122. The gate voltage of the P-channel bidirectionally conductive field effect transistor 214 is connected to the external terminal 120 to be increased to the source voltage of the P-channel bidirectionally conductive field effect transistor 214, to thereby reduce a leakage current. The back gate terminal of the P-channel bidirectionally conductive field effect transistor 214 is connected to the external terminal 120 via the terminal 125 and the PMOS transistor 262 and hence does not become a floating state, which enables more stable operation of the charge/discharge control circuit 251. The positive power supply of the control circuit 102 is connected to the terminal 125, and hence the voltage at the external terminal 120 can be output as High.

When the load 131 is connected between the external terminals 120 and 121 and the control circuit 102 detects that the secondary battery 101 has entered a discharge-inhibited state, the output terminals 126 and 128 of the control circuit 102 output Low and the output terminal 127 thereof outputs High. Then, the PMOS transistor 210 is turned ON, the NMOS transistor 211 is turned OFF, the PMOS transistor 261 is turned ON, and the PMOS transistor 262 is turned OFF. Then, the gate electrode of the P-channel bidirectionally conductive field effect transistor 214 is connected to the positive power supply terminal 122 via the PMOS transistor 261, the terminal 125, and the PMOS transistor 210. The P-channel bidirectionally conductive field effect transistor 214 then enters the OFF state. This way, a discharge current is interrupted to prevent overdischarge of the secondary battery 101. Here, a parasitic diode 272 is reverse-biased to prevent the current from flowing from the positive power supply terminal 122 to the external terminal 120. The gate voltage of the P-channel bidirectionally conductive field effect transistor 214 is connected to the positive power supply terminal 122 to be increased to the source voltage of the P-channel bidirectionally conductive field effect transistor 214, to thereby reduce a leakage current. The back gate terminal of the P-channel bidirectionally conductive field effect transistor 214 is connected to the positive power supply terminal 122 via the terminal 125 and the PMOS transistor 261 and hence does not become a floating state, which enables more stable operation of the charge/discharge control circuit 251. The positive power supply of the control circuit 102 is connected to the terminal 125, and hence the voltage at the positive power supply terminal 122 can be output as High.

Note that, the P-channel bidirectionally conductive field effect transistor 214 may be externally connected to the charge/discharge control circuit 251.

As described above, according to the battery device including the charge/discharge control circuit 251 of the second embodiment, the leakage current flowing through the P-channel bidirectionally conductive field effect transistor 214 can be reduced in either case where the secondary battery 101 has entered the charge-inhibited state or the discharge-inhibited state. In addition, by connecting the back gate of the P-channel bidirectionally conductive field effect transistor 214 to the external terminal 120 or the positive power supply terminal 122, the charge/discharge control circuit 251 can be operated stably.

[Third Embodiment]

Figure 3:
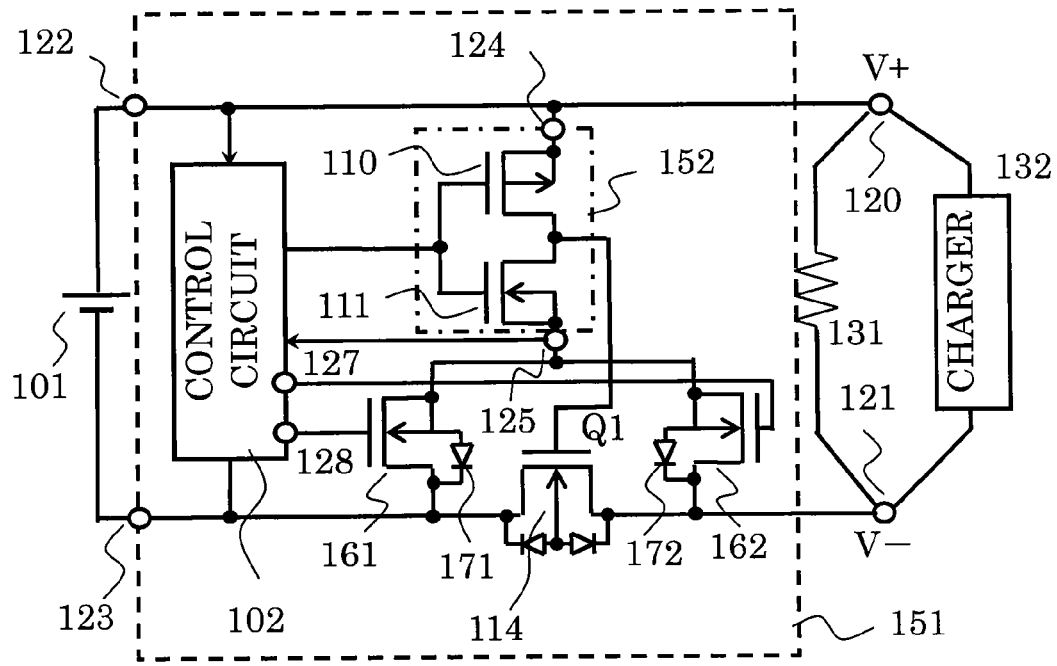
FIG. 3 is a circuit diagram of a battery device including a charge/discharge control circuit according to a third embodiment of the present invention.

FIG. 3 is a circuit diagram of a battery device including a charge/discharge control circuit 351 according to a third embodiment of the present invention.

FIG. 3 is different from FIG. 1 in that the terminal 125 and the back gate of the N-channel bidirectionally conductive field effect transistor 114 are disconnected from each other.

Next, an operation of the battery device including the charge/discharge control circuit 351 according to the third embodiment is described.

When the charger 132 is connected between the external terminals 120 and 121 and the control circuit 102 detects that the secondary battery 101 is in a chargeable/dischargeable state, the output terminal 126 of the control circuit 102 outputs Low and the output terminals 127 and 128 thereof output High. Then, the PMOS transistor 110 is turned ON, the NMOS transistor 111 is turned OFF, the NMOS transistor 161 is turned ON, and the NMOS transistor 162 is turned ON. Then, the gate electrode of the N-channel bidirectionally conductive field effect transistor 114 is connected to the positive power supply terminal 122, and the N-channel bidirectionally conductive field effect transistor 114 enters an ON state. This way, charge/discharge is performed. The negative power supply of the control circuit 102 is connected to the terminal 125, and hence a lower one of the voltage at the negative power supply terminal 123 and the voltage at the external terminal 121 can be output as Low. Here, the respective outputs of the control circuit 102 may be such that: the output terminals 126 and 128 output Low while the output terminal 127 outputs High; or the output terminals 126 and 127 output Low while the output terminal 128 outputs High.

When the charger 132 is connected between the external terminals 120 and 121 and the control circuit 102 detects that the secondary battery 101 has entered a charge-inhibited state, the output terminals 126 and 127 of the control circuit 102 output High and the output terminal 128 thereof outputs Low. Then, the PMOS transistor 110 is turned OFF, the NMOS transistor 111 is turned ON, the NMOS transistor 161 is turned OFF, and the NMOS transistor 162 is turned ON. Then, the gate electrode of the N-channel bidirectionally conductive field effect transistor 114 is connected to the external terminal 121 via the NMOS transistor 162, the terminal 125, and the NMOS transistor 111. The N-channel bidirectionally conductive field effect transistor 114 then enters the OFF state. This way, a charge current is interrupted to prevent overcharge of the secondary battery 101. Here, the parasitic diode 171 is reverse-biased to prevent the current from flowing from the negative power supply terminal 123 to the external terminal 121. The gate voltage of the N-channel bidirectionally conductive field effect transistor 114 is connected to the external terminal 121 to be reduced to the source voltage of the N-channel bidirectionally conductive field effect transistor 114, to thereby reduce a leakage current. The negative power supply of the control circuit 102 is connected to the terminal 125, and hence the voltage at the external terminal 121 can be output as Low.

When the load 131 is connected between the external terminals 120 and 121 and the control circuit 102 detects that the secondary battery 101 has entered a discharge-inhibited state, the output terminals 126 and 128 of the control circuit 102 output High and the output terminal 127 thereof outputs Low. Then, the PMOS transistor 110 is turned OFF, the NMOS transistor 111 is turned ON, the NMOS transistor 161 is turned ON, and the NMOS transistor 162 is turned OFF. Then, the gate electrode of the N-channel bidirectionally conductive field effect transistor 114 is connected to the negative power supply terminal 123 via the NMOS transistor 161, the terminal 125, and the NMOS transistor 111. The N-channel bidirectionally conductive field effect transistor 114 then enters the OFF state. This way, a discharge current is interrupted to prevent overdischarge of the secondary battery 101. Here, the parasitic diode 172 is reverse-biased to prevent the current from flowing from the external terminal 121 to the negative power supply terminal 123. The gate voltage of the N-channel bidirectionally conductive field effect transistor 114 is connected to the negative power supply terminal 123 to be reduced to the drain voltage of the N-channel bidirectionally conductive field effect transistor 114, to thereby reduce a leakage current. The negative power supply of the control circuit 102 is connected to the terminal 125, and hence the voltage at the negative power supply terminal 123 can be output as Low.

Note that, the N-channel bidirectionally conductive field effect transistor 114 may be externally connected to the charge/discharge control circuit 351.

As described above, according to the battery device including the charge/discharge control circuit 351 of the third embodiment, the leakage current flowing through the N-channel bidirectionally conductive field effect transistor 114 can be reduced in either case where the secondary battery 101 has entered the charge-inhibited state or the discharge-inhibited state.

[Fourth Embodiment]

Figure 4:
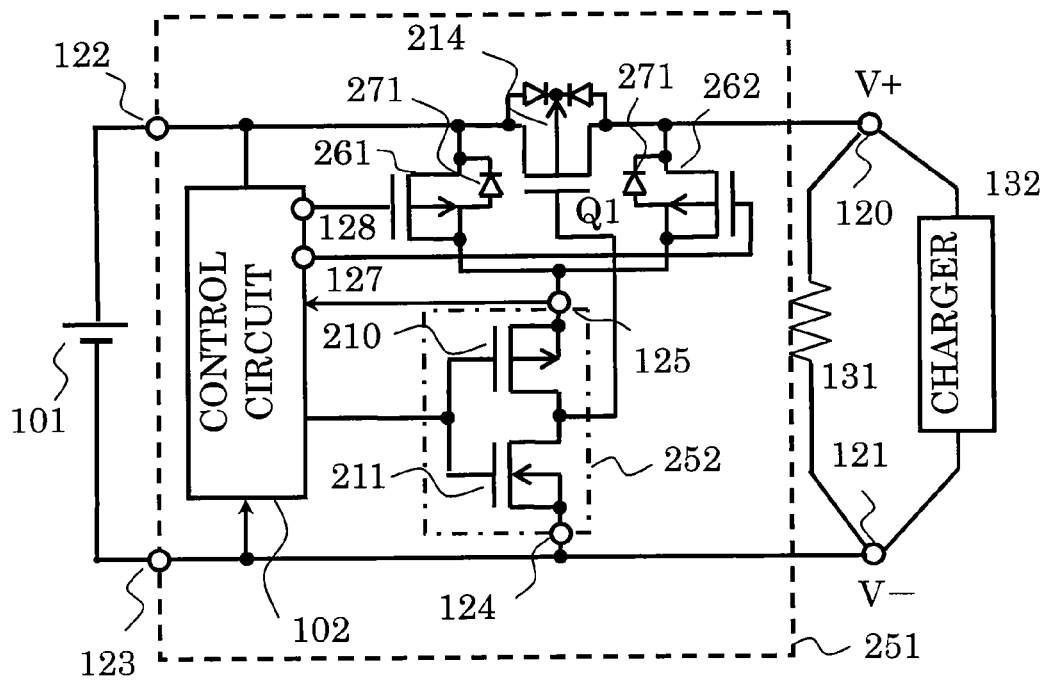
FIG. 4 is a circuit diagram of a battery device including a charge/discharge control circuit according to a fourth embodiment of the present invention.
Figure 5:
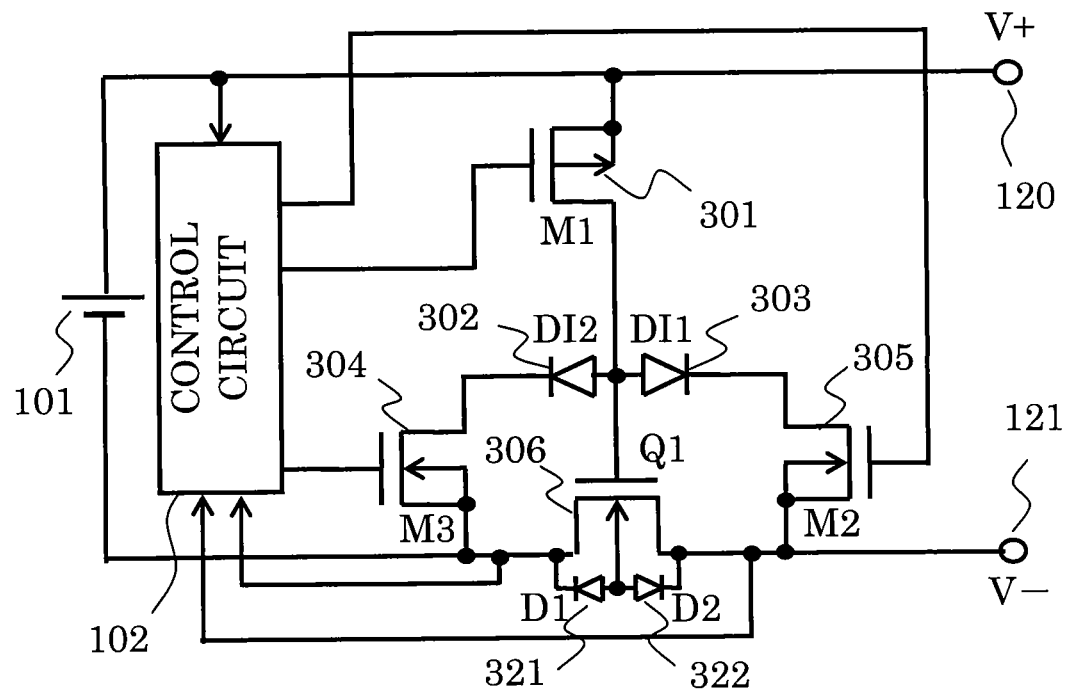
FIG. 5 is a circuit diagram of a battery device including a conventional charge/discharge control circuit.

FIG. 4 is a circuit diagram of a battery device including a charge/discharge control circuit 451 according to a fourth embodiment of the present invention.

FIG. 4 is different from FIG. 2 in that the terminal 125 and the back gate of the P-channel bidirectionally conductive field effect transistor 214 are disconnected from each other.

Next, an operation of the battery device including the charge/discharge control circuit 451 according to the fourth embodiment is described.

When the charger 132 is connected between the external terminals 120 and 121 and the control circuit 102 detects that the secondary battery 101 is in a chargeable/dischargeable state, the output terminal 126 of the control circuit 102 outputs High and the output terminals 127 and 128 thereof output Low. Then, the PMOS transistor 210 is turned OFF, the NMOS transistor 211 is turned ON, the PMOS transistor 261 is turned ON, and the PMOS transistor 262 is turned ON. Then, the gate electrode of the P-channel bidirectionally conductive field effect transistor 214 is connected to the negative power supply terminal 123, and the P-channel bidirectionally conductive field effect transistor 214 enters an ON state. This way, charge/discharge is performed. The positive power supply of the control circuit 102 is connected to the terminal 125, and hence a higher one of the voltage at the positive power supply terminal 122 and the voltage at the external terminal 120 can be output as High. Here, the respective outputs of the control circuit 102 may be such that: the output terminals 126 and 128 output High while the output terminal 127 outputs Low; or the output terminals 126 and 127 output High while the output terminal 128 outputs Low.

When the charger 132 is connected between the external terminals 120 and 121 and the control circuit 102 detects that the secondary battery 101 has entered a charge-inhibited state, the output terminals 126 and 127 of the control circuit 102 output Low and the output terminal 128 thereof outputs High. Then, the PMOS transistor 210 is turned ON, the NMOS transistor 211 is turned OFF, the PMOS transistor 261 is turned OFF, and the PMOS transistor 262 is turned ON. Then, the gate electrode of the P-channel bidirectionally conductive field effect transistor 214 is connected to the external terminal 120 via the PMOS transistor 262, the terminal 125, and the PMOS transistor 210. The P-channel bidirectionally conductive field effect transistor 214 then enters the OFF state. This way, a charge current is interrupted to prevent overcharge of the secondary battery 101. Here, the parasitic diode 271 is reverse-biased to prevent the current from flowing from the external terminal 120 to the positive power supply terminal 122. The gate voltage of the P-channel bidirectionally conductive field effect transistor 214 is connected to the external terminal 120 to be increased to the source voltage of the P-channel bidirectionally conductive field effect transistor 214, to thereby reduce a leakage current. The positive power supply of the control circuit 102 is connected to the terminal 125, and hence the voltage at the external terminal 120 can be output as High.

When the load 131 is connected between the external terminals 120 and 121 and the control circuit 102 detects that the secondary battery 101 has entered a discharge-inhibited state, the output terminals 126 and 128 of the control circuit 102 output Low and the output terminal 127 thereof outputs High. Then, the PMOS transistor 210 is turned ON, the NMOS transistor 211 is turned OFF, the PMOS transistor 261 is turned ON, and the PMOS transistor 262 is turned OFF. Then, the gate electrode of the P-channel bidirectionally conductive field effect transistor 214 is connected to the positive power supply terminal 122 via the PMOS transistor 261, the terminal 125, and the PMOS transistor 210. The P-channel bidirectionally conductive field effect transistor 214 then enters the OFF state. This way, a discharge current is interrupted to prevent overdischarge of the secondary battery 101. Here, the parasitic diode 272 is reverse-biased to prevent the current from flowing from the positive power supply terminal 122 to the external terminal 120. The gate voltage of the P-channel bidirectionally conductive field effect transistor 214 is connected to the positive power supply terminal 122 to be increased to the source voltage of the P-channel bidirectionally conductive field effect transistor 214, to thereby reduce a leakage current. The positive power supply of the control circuit 102 is connected to the terminal 125, and hence the voltage at the positive power supply terminal 122 can be output as High.

Note that, the P-channel bidirectionally conductive field effect transistor 214 may be externally connected to the charge/discharge control circuit 451.

As described above, according to the battery device including the charge/discharge control circuit 451 of the fourth embodiment, the leakage current flowing through the P-channel bidirectionally conductive field effect transistor 214 can be reduced in either case where the secondary battery 101 has entered the charge-inhibited state or the discharge-inhibited state.

[Fifth Embodiment]

Figure 6:
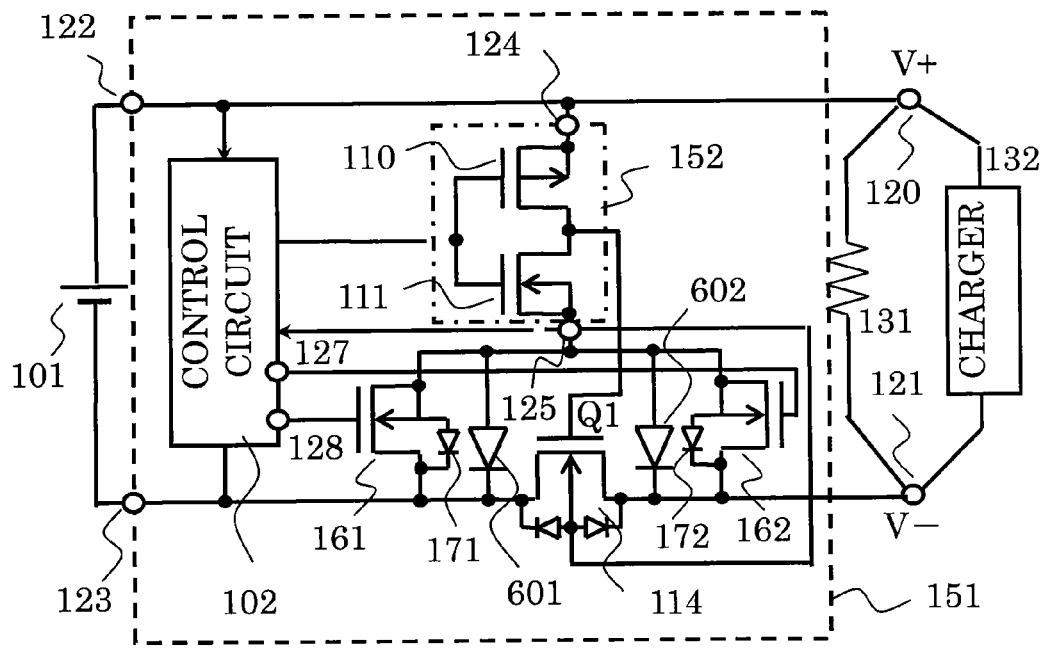
FIG. 6 is a circuit diagram of a battery device including a charge/discharge control circuit according to a fifth embodiment of the present invention.

FIG. 6 is a circuit diagram of a battery device including a charge/discharge control circuit 651 according to a fifth embodiment of the present invention.

FIG. 6 is different from FIG. 1 in that Schottky barrier diodes 601 and 602 are added. The Schottky barrier diode 601 has an anode connected to the source of the NMOS transistor 161 and a cathode connected to the drain of the NMOS transistor 161. The Schottky barrier diode 602 has an anode connected to the source of the NMOS transistor 162 and a cathode connected to the drain of the NMOS transistor 162.

Next, an operation of the battery device including the charge/discharge control circuit 651 according to the fifth embodiment is described.

When the charger 132 is connected between the external terminals 120 and 121 and the control circuit 102 detects that the secondary battery 101 is in a chargeable/dischargeable state, the output terminal 126 of the control circuit 102 outputs Low and the output terminals 127 and 128 thereof output High. Then, the PMOS transistor 110 is turned ON, the NMOS transistor 111 is turned OFF, the NMOS transistor 161 is turned ON, and the NMOS transistor 162 is turned ON. Then, the gate electrode of the N-channel bidirectionally conductive field effect transistor 114 is connected to the positive power supply terminal 122, and the N-channel bidirectionally conductive field effect transistor 114 enters an ON state. This way, charge/discharge is performed. Here, the respective outputs of the control circuit 102 may be such that: the output terminals 126 and 128 output Low while the output terminal 127 outputs High; the output terminals 126 and 127 output Low while the output terminal 128 outputs High; or the output terminals 126, 127, and 128 output Low. The negative power supply of the control circuit 102 is connected to the terminal 125, and hence a lower one of the voltage at the negative power supply terminal 123 and the voltage at the external terminal 121 can be output as Low.

When the charger 132 is connected between the external terminals 120 and 121 and the control circuit 102 detects that the secondary battery 101 has entered a charge-inhibited state, the output terminals 126 and 127 of the control circuit 102 output High and the output terminal 128 thereof outputs Low. Then, the PMOS transistor 110 is turned OFF, the NMOS transistor 111 is turned ON, the NMOS transistor 161 is turned OFF, and the NMOS transistor 162 is turned ON. Then, the gate of the N-channel bidirectionally conductive field effect transistor 114 is connected to the external terminal 121 via the NMOS transistor 162, the terminal 125, and the NMOS transistor 111. The N-channel bidirectionally conductive field effect transistor 114 then enters the OFF state. This way, a charge current is interrupted to prevent overcharge of the secondary battery 101. Here, the parasitic diode 171 is reverse-biased to prevent the current from flowing from the negative power supply terminal 123 to the external terminal 121. The gate voltage of the N-channel bidirectionally conductive field effect transistor 114 is connected to the external terminal 121 to be reduced to the source voltage of the N-channel bidirectionally conductive field effect transistor 114, to thereby reduce a leakage current. The back gate terminal of the N-channel bidirectionally conductive field effect transistor 114 is connected to the external terminal 121 via the terminal 125 and the NMOS transistor 162 and hence does not become a floating state, which enables more stable operation of the charge/discharge control circuit 651. The negative power supply of the control circuit 102 is connected to the terminal 125, and hence the voltage at the external terminal 121 can be output as Low. The Schottky barrier diode 602 can prevent the terminal 125 from becoming a floating state even if the NMOS transistor 161 and the NMOS transistor 162 are instantaneously turned OFF when the NMOS transistor 162 is changed from OFF to ON.

When the load 131 is connected between the external terminals 120 and 121 and the control circuit 102 detects that the secondary battery 101 has entered a discharge-inhibited state, the output terminals 126 and 128 of the control circuit 102 output High and the output terminal 127 thereof outputs Low. Then, the PMOS transistor 110 is turned OFF, the NMOS transistor 111 is turned ON, the NMOS transistor 161 is turned ON, and the NMOS transistor 162 is turned OFF. Then, the gate of the N-channel bidirectionally conductive field effect transistor 114 is connected to the negative power supply terminal 123 via the NMOS transistor 161, the terminal 125, and the NMOS transistor 111. The N-channel bidirectionally conductive field effect transistor 114 then enters the OFF state. This way, a discharge current is interrupted to prevent overdischarge of the secondary battery 101. Here, the parasitic diode 172 is reverse-biased to prevent the current from flowing from the external terminal 121 to the negative power supply terminal 123. The gate voltage of the N-channel bidirectionally conductive field effect transistor 114 is connected to the negative power supply terminal 123 to be reduced to the drain voltage of the N-channel bidirectionally conductive field effect transistor 114, to thereby reduce a leakage current. The back gate terminal of the N-channel bidirectionally conductive field effect transistor 114 is connected to the negative power supply terminal 123 via the terminal 125 and the NMOS transistor 161 and hence does not become a floating state, which enables more stable operation of the charge/discharge control circuit 651. The negative power supply of the control circuit 102 is connected to the terminal 125, and hence the voltage at the positive power supply terminal 123 can be output as Low. The Schottky barrier diode 601 can prevent the terminal 125 from becoming a floating state even if the NMOS transistor 161 and the NMOS transistor 162 are instantaneously turned OFF when the NMOS transistor 161 is changed from OFF to ON.

As described above, according to the battery device including the charge/discharge control circuit 651 of the fifth embodiment, the leakage current flowing through the N-channel bidirectionally conductive field effect transistor 114 can be reduced in either case where the secondary battery 101 has entered the charge-inhibited state or the discharge-inhibited state. In addition, by connecting the back gate of the N-channel bidirectionally conductive field effect transistor 114 to the external terminal 121 or the negative power supply terminal 123, the charge/discharge control circuit 651 can be operated stably.

Note that, the N-channel bidirectionally conductive field effect transistor 114 may be externally connected to the charge/discharge control circuit 651. Further, the leakage current can be reduced also in a configuration in which the back gate of the N-channel bidirectionally conductive field effect transistor 114 is not connected to the terminal 125.

[Sixth Embodiment]

Figure 7:
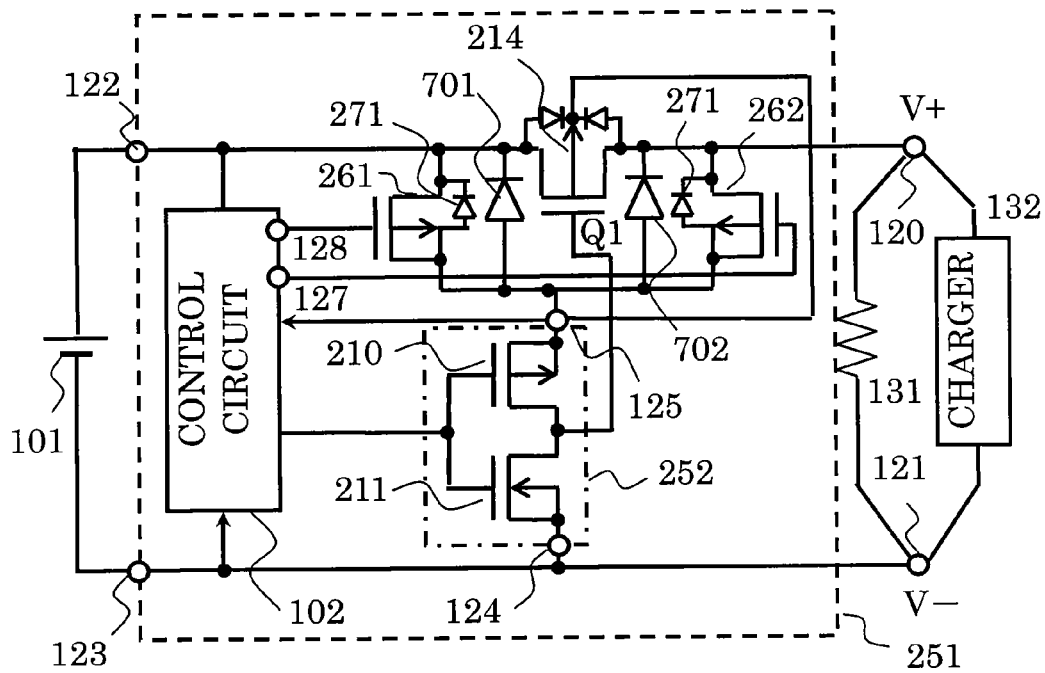
FIG. 7 is a circuit diagram of a battery device including a charge/discharge control circuit according to a sixth embodiment of the present invention.

FIG. 7 is a circuit diagram of a battery device including a charge/discharge control circuit 751 according to a sixth embodiment of the present invention.

FIG. 7 is different from FIG. 2 in that Schottky barrier diodes 701 and 702 are added. The Schottky barrier diode 701 has an anode connected to the source of the PMOS transistor 261 and a cathode connected to the drain of the PMOS transistor 261. The Schottky barrier diode 702 has an anode connected to the source of the PMOS transistor 262 and a cathode connected to the drain of the PMOS transistor 262.

Next, an operation of the battery device including the charge/discharge control circuit 751 according to the sixth embodiment is described.

When the charger 132 is connected between the external terminals 120 and 121 and the control circuit 102 detects that the secondary battery 101 is in a chargeable/dischargeable state, the output terminal 126 of the control circuit 102 outputs High and the output terminals 127 and 128 thereof output Low. Then, the PMOS transistor 210 is turned OFF, the NMOS transistor 211 is turned ON, the PMOS transistor 261 is turned ON, and the PMOS transistor 262 is turned ON. Then, the gate electrode of the P-channel bidirectionally conductive field effect transistor 214 is connected to the negative power supply terminal 123, and the P-channel bidirectionally conductive field effect transistor 214 enters an ON state. This way, charge/discharge is performed. Here, the respective outputs of the control circuit 102 may be such that: the output terminals 126 and 128 output High while the output terminal 127 outputs Low; the output terminals 126 and 127 output High while the output terminal 128 outputs Low; or the output terminals 126, 127, and 128 output High. The positive power supply of the control circuit 102 is connected to the terminal 125, and hence a higher one of the voltage at the positive power supply terminal 122 and the voltage at the external terminal 120 can be output as High.

When the charger 132 is connected between the external terminals 120 and 121 and the control circuit 102 detects that the secondary battery 101 has entered a charge-inhibited state, the output terminals 126 and 127 of the control circuit 102 output Low and the output terminal 128 thereof outputs High. Then, the PMOS transistor 210 is turned ON, the NMOS transistor 211 is turned OFF, the PMOS transistor 261 is turned OFF, and the PMOS transistor 262 is turned ON. Then, the gate electrode of the P-channel bidirectionally conductive field effect transistor 214 is connected to the external terminal 120 via the PMOS transistor 262, the terminal 125, and the PMOS transistor 210. The P-channel bidirectionally conductive field effect transistor 214 then enters the OFF state. This way, a charge current is interrupted to prevent overcharge of the secondary battery 101. Here, the parasitic diode 271 is reverse-biased to prevent the current from flowing from the external terminal 120 to the positive power supply terminal 122. The gate voltage of the P-channel bidirectionally conductive field effect transistor 214 is connected to the external terminal 120 to be increased to the source voltage of the P-channel bidirectionally conductive field effect transistor 214, to thereby reduce a leakage current. The back gate terminal of the P-channel bidirectionally conductive field effect transistor 214 is connected to the external terminal 120 via the terminal 125 and the PMOS transistor 262 and hence does not become a floating state, which enables more stable operation of the charge/discharge control circuit 751. The positive power supply of the control circuit 102 is connected to the terminal 125, and hence the voltage at the external terminal 120 can be output as High. The Schottky barrier diode 702 can prevent the terminal 125 from becoming a floating state even if the PMOS transistor 261 and the PMOS transistor 262 are instantaneously turned OFF when the PMOS transistor 262 is changed from OFF to ON.

When the load 131 is connected between the external terminals 120 and 121 and the control circuit 102 detects that the secondary battery 101 has entered a discharge-inhibited state, the output terminals 126 and 128 of the control circuit 102 output Low and the output terminal 127 thereof outputs High. Then, the PMOS transistor 210 is turned ON, the NMOS transistor 211 is turned OFF, the PMOS transistor 261 is turned ON, and the PMOS transistor 262 is turned OFF. Then, the gate electrode of the P-channel bidirectionally conductive field effect transistor 214 is connected to the positive power supply terminal 122 via the PMOS transistor 261, the terminal 125, and the PMOS transistor 210. The P-channel bidirectionally conductive field effect transistor 214 then enters the OFF state. This way, a discharge current is interrupted to prevent overdischarge of the secondary battery 101. Here, the parasitic diode 272 is reverse-biased to prevent the current from flowing from the positive power supply terminal 122 to the external terminal 120. The gate voltage of the P-channel bidirectionally conductive field effect transistor 214 is connected to the positive power supply terminal 122 to be increased to the source voltage of the P-channel bidirectionally conductive field effect transistor 214, to thereby reduce a leakage current. The back gate terminal of the P-channel bidirectionally conductive field effect transistor 214 is connected to the positive power supply terminal 122 via the terminal 125 and the PMOS transistor 261 and hence does not become a floating state, which enables more stable operation of the charge/discharge control circuit 751. The positive power supply of the control circuit 102 is connected to the terminal 125, and hence the voltage at the positive power supply terminal 122 can be output as High. The Schottky barrier diode 701 can prevent the terminal 125 from becoming a floating state even if the PMOS transistor 261 and the PMOS transistor 262 are instantaneously turned OFF when the PMOS transistor 261 is changed from OFF to ON.

As described above, according to the battery device including the charge/discharge control circuit 751 of the sixth embodiment, the leakage current flowing through the P-channel bidirectionally conductive field effect transistor 214 can be reduced in either case where the secondary battery 101 has entered the charge-inhibited state or the discharge-inhibited state. In addition, by connecting the back gate of the P-channel bidirectionally conductive field effect transistor 214 to the external terminal 120 or the positive power supply terminal 122, the charge/discharge control circuit 751 can be operated stably.

Note that, the P-channel bidirectionally conductive field effect transistor 214 may be externally connected to the charge/discharge control circuit 751. Further, the leakage current can be reduced also in a configuration in which the back gate of the P-channel bidirectionally conductive field effect transistor 214 is not connected to the terminal 125.

What is claimed is:

1. A charge and discharge control circuit for controlling charge and discharge of a secondary battery by a single bidirectionally conductive field effect transistor, the charge and discharge control circuit comprising:
   a control circuit connected to both ends of the secondary battery, and configured to determine whether the secondary battery is in a charge-inhibited or a discharge-inhibited state;
   a switch circuit including a first terminal connected to a back gate of the bidirectionally conductive field effect transistor and a second terminal, for controlling a gate of the bidirectionally conductive field effect transistor based on an output of the control circuit, wherein the switch circuit comprises:
      a P-channel MOS transistor including a gate connected to a first output terminal of the control circuit, a drain connected to the gate of the bidirectionally conductive field effect transistor, and a source connected to the second terminal; and
      an N-channel MOS transistor including a gate connected to the first output terminal of the control circuit, a drain connected to the gate of the bidirectionally conductive field effect transistor and to the drain of the P-channel MOS transistor to provide a drain-to-drain connection of the P-channel MOS transistor and N-channel MOS transistor, wherein a voltage at the drain-to-drain connection is provided to the gate of the bidirectionally conductive field effect transistor, and a source connected to the first terminal;
   a first transistor including a drain connected to a drain of the bidirectionally conductive field effect transistor, and a source and a back gate which are connected to the first terminal of the switch circuit; and
   a second transistor including a drain connected to a source of the bidirectionally conductive field effect transistor, and a source and a back gate which are connected to the first terminal of the switch circuit.

2. A charge and discharge control circuit according to claim 1, further comprising:
   a first PN junction element connected between the drain and the source of the first transistor; and
   a second PN junction element connected between the drain and the source of the second transistor.

3. A charge and discharge control circuit according to claim 1, wherein:
   the first transistor comprises an N-channel MOS transistor including a gate connected to a second output terminal of the control circuit; and
   the second transistor comprises an N-channel MOS transistor including a gate connected to a third output terminal of the control circuit.

4. A charge and discharge control circuit according to claim 1, wherein the control circuit includes a negative power supply terminal connected to the first terminal of the switch circuit.

5. A battery device, comprising:
   a chargeable and dischargeable secondary battery;
   a single bidirectionally conductive field effect transistor serving as a charge and discharge control switch, which is provided in a charge and discharge path of the chargeable and dischargeable secondary battery; and
   the charge and discharge control circuit according to claim 1, for monitoring a voltage of the chargeable and dischargeable secondary battery to open/close the charge and discharge control switch, to thereby control charge and discharge of the chargeable and dischargeable secondary battery.

6. A charge and discharge control circuit according to claim 1, wherein,
   the control circuit is configured to determine whether the secondary battery is in a charge-inhibited state or a discharge inhibited state, and
   responsive to a determination that the secondary battery is in a charge-inhibited state, the control circuit is further configured to turn OFF the first transistor and turn ON the second transistor,
   responsive to a determination that the secondary batter is in a discharge-inhibited state, the control circuit is further configured to turn ON the first transistor and turn OFF the second transistor.

7. A charge and discharge control circuit for controlling charge and discharge of a secondary battery by a single bidirectionally conductive field effect transistor, comprising:
   a control circuit connected to both ends of the secondary battery, and configured to determine whether the secondary battery is in a charge-inhibited or a discharge-inhibited state;
   a switch circuit including a first terminal connected to a back gate of the bidirectionally conductive field effect transistor and a second terminal, for controlling a gate of the bidirectionally conductive field effect transistor based on an output of the control circuit, wherein the switch circuit comprises:
      a P-channel MOS transistor including a gate connected to a first output terminal of the control circuit, a drain connected to the gate of the bidirectionally conductive field effect transistor, and a source connected to the first terminal of the switch circuit; and
      an N-channel MOS transistor including a gate connected to the first output terminal of the control circuit, a drain connected to the gate of the bidirectionally conductive field effect transistor and to the drain of the P-channel MOS transistor to provide a drain-to-drain connection of the P-channel MOS transistor and N-channel MOS transistor, wherein a voltage at the drain-to-drain connection is provided to the gate of the bidirectionally conductive field effect transistor, and a source connected to the second terminal of the switch circuit;
   a first transistor including a drain connected to a drain of the bidirectionally conductive field effect transistor, and a source and a back gate which are connected to the first terminal of the switch circuit; and
   a second transistor including a drain connected to a source of the bidirectionally conductive field effect transistor, and a source and a back gate which are connected to the first terminal of the switch circuit, wherein, responsive to a determination that the secondary battery is in a charge-inhibited state, the control circuit is configured to turn OFF the first transistor and turn ON the second transistor, and responsive to a determination that the secondary batter is in a discharge-inhibited state, the control circuit is configured to turn ON the first transistor and turn OFF the second transistor.

8. A charge and discharge control circuit according to claim 7, wherein:
the first transistor comprises a P-channel MOS transistor including a gate connected to a second output terminal of the control circuit; and
the second transistor comprises a P-channel MOS transistor including a gate connected to a third output terminal of the control circuit.

9. A charge and discharge control circuit according to claim 7, wherein the control circuit includes a positive power supply terminal connected to the first terminal of the switch circuit.

* * * * *